United States Patent
Lemmon et al.

(10) Patent No.: US 7,175,826 B2
(45) Date of Patent: Feb. 13, 2007

(54) COMPOSITIONS AND METHODS FOR HYDROGEN STORAGE AND RECOVERY

(75) Inventors: John Patrick Lemmon, Schoharie, NY (US); William Paul Minnear, Clifton Park, NY (US); Luke Nathaniel Brewer, Albuquerque, NM (US); Susan Holt Townsend, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 479 days.

(21) Appl. No.: 10/747,838

(22) Filed: Dec. 29, 2003

(65) Prior Publication Data

US 2005/0148466 A1 Jul. 7, 2005

(51) Int. Cl.
*C01B 6/04* (2006.01)
*B01J 23/02* (2006.01)

(52) U.S. Cl. ............ 423/645; 423/658.2; 502/100; 502/340

(58) Field of Classification Search ............ None
See application file for complete search history.

(56) References Cited

U.S. PATENT DOCUMENTS

| | | | |
|---|---|---|---|
| 3,138,560 A * | 6/1964 | Bair et al. | 502/185 |
| 4,397,834 A | 8/1983 | Mendelsohn et al. | |
| 4,613,362 A * | 9/1986 | Welter et al. | 502/328 |
| 4,716,726 A | 1/1988 | Nowaczyk | |
| 4,716,736 A | 1/1988 | Schwarz | |
| 4,820,226 A | 4/1989 | Hsu | |
| 5,389,333 A | 2/1995 | Li et al. | |
| 5,882,623 A | 3/1999 | Zaluska et al. | |
| 6,024,935 A | 2/2000 | Mills et al. | |
| 6,030,724 A * | 2/2000 | Sawa et al. | 429/218.2 |
| 6,080,381 A | 6/2000 | Zaluska et al. | |
| 6,137,550 A | 10/2000 | Hinchliffe et al. | |
| 6,329,076 B1 | 12/2001 | Kawabe et al. | |
| 6,447,942 B1 | 9/2002 | Ovshinsky et al. | |
| 6,447,953 B1 * | 9/2002 | Fierro et al. | 429/223 |
| 6,461,766 B1 * | 10/2002 | Young et al. | 429/218.2 |
| 6,579,833 B1 | 6/2003 | McNallan et al. | |
| 6,602,485 B1 | 8/2003 | Tsuboi | |
| 2002/0100725 A1 | 8/2002 | Lee et al. | |
| 2003/0007926 A1 * | 1/2003 | Jiang et al. | 423/651 |

(Continued)

FOREIGN PATENT DOCUMENTS

DE 35 35 378 4/1987

(Continued)

OTHER PUBLICATIONS

International Search Report Considered.*

(Continued)

*Primary Examiner*—Wayne A. Langel
*Assistant Examiner*—Paul Wartalowicz
(74) *Attorney, Agent, or Firm*—Shawn A. McClintic; William E. Powell, III

(57) ABSTRACT

Disclosed herein is a hydrogen storage composition comprising a catalyst composition disposed upon a storage composition; wherein the catalyst composition comprises an alloy of calcium, barium, platinum, palladium, nickel, titanium, chromium, manganese, iron, cobalt, copper, silicon, germanium, rhodium, rhodium, ruthenium, molybdenum, niobium, zirconium, yttrium, barium, lanthanum, hafnium, tungsten, rhenium, osmium, iridium, or a combination comprising at least one of the foregoing metals.

4 Claims, 2 Drawing Sheets

U.S. PATENT DOCUMENTS

Figure 2:
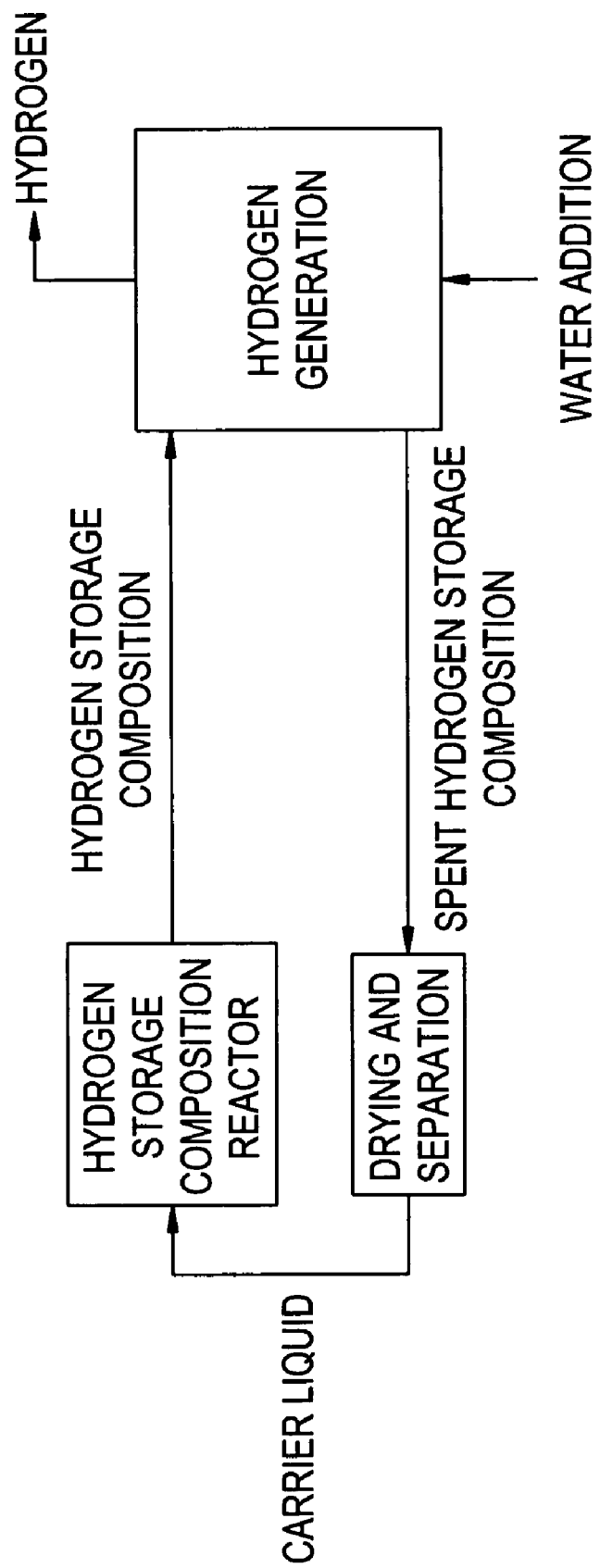

2003/0039830 A1* 2/2003 Takeda et al. ............. 428/364
2004/0105805 A1* 6/2004 Zidan ......................... 423/286

FOREIGN PATENT DOCUMENTS

| DE | 3535378 | 4/1987 |
|---|---|---|
| EP | 0 355 207 | 2/1990 |
| EP | 1 116 797 A1 | 7/2001 |
| WO | WO 95/25355 | 9/1995 |
| WO | WO 97/43206 | 11/1997 |
| WO | WO 98/10329 | 3/1998 |
| WO | WO 98/15986 | 4/1998 |
| WO | WO 01/30520 A1 | 5/2001 |
| WO | WO 01/51410 A1 | 7/2001 |
| WO | WO 01/68515 | 9/2001 |
| WO | WO 02/087291 A2 | 10/2002 |
| WO | WO 03/050447 | 6/2003 |
| WO | WO 03/053848 | 7/2003 |

OTHER PUBLICATIONS

European Search Report dated Sep. 9, 2005.
Ji-Cheng Zhao, "A Combinatorial Approach for Structural Materials", *Advanced Engineering Materials 2001*, 3, No. 3, pp. 143-147.
Ji-Cheng Zhao, "A combinatorial approach for efficient mapping of phase diagrams and properties", *J. Mater. Res.*, vol. 16, No. 6, Jun. 2001, pp. 1565-1578.
Kentaro Ito and Tetsuya Kubo, "Gas Detection by Hydrochromism", Proceedings of the 4th Sensor Symposium, 1984, pp. 153-156.
K. Ito and T. Ohgami, "Hydrogen detection based on coloration of anodic tungsten oxide film", *Appl. Phys. Lett.* 60 (8), Feb. 24, 1992, pp. 938-940.
Hydride Basics, "Solid-H(TM) Metal Hydrides", U.S. Patent No. 4,600,525, http://www.hydrogencomponents.com/hydride.html, Sep. 6, 2003, pp. 1-3.
K. Christmann, "Interaction of Hydrogen With Solid Surfaces", *Surface Science Reports 9* (1988) 1-163, North-Holland, Amsterdam, Manuscript received in final form Apr. 13, 1988, pp. 1-163.
D. J. Taylor et al, "Microstructure of Laser-Fired, Sol-Gel-Derived Tungsten Oxide Films", *Chem. Mater,* 1996, 8, pp. 1396-1401.
Sung Hyeon Baeck et al, "Photoelectrochemical Hydrogen Production Using New Combinatorial Chemistry Derived Materials", Proceedings of the 2002 DOE Hydrogen Program Review, NREL/CP-610-32405, DOE Project # DE-FC36-01GO11092, P1: Eric W. McFarland, pp. 1-10.
Jussi Eloranta et al, "Photogeneration of atomic hydrogen in rare gas matrices", accepted Jan. 25, 1999, *Journal of Chemical Physics*, vol. 110, No. 16, pp. 7917-7925.
Darlene K. Slattery and Michael D. Hampton, "Complex Hydrides for Hydrogen Storage", Proceedings of the 2002 DOE Hydrogen Program Review, NREL/CP-610-32405, pp. 1-9.
Thomas F. Jaramillo et al, "Articles, High-Throughput Screening System for Catalytic Hydrogen-Producing Materials", *J. Comb. Chem.* 2002, 4, 17-22.
John J. Petrovic, Advanced Concepts for Hydrogen Storage, DOE Hydrogen Storage Workshop, Argonne National Laboratory, Aug. 14-15, 2002.
Wim Soppe et al, Institute of Microtechnology (IMT), Microwave Plasma Assisted VHF-PECVD of Micro-Crystalline Silicon.
A.F. Djakov, V.D. Rusanov, RAO "EES Russia", Russia, Hydrogen In Energy In Long-Term Prospect, World Energy Council, http://www.worldenergy.org/wec-geis/publications/default/tech_papers/17th_congress/3_3_09.asp, Sep. 12, 2003, pp. 1-6.
Hydrogen Review Article, Hydrogen Review, http://naftp.nrcce.wvu.edu/techinfo/altfuels/H2/Hydrogen.html, Sep. 11, 2003, pp. 1-10.
Thomas Klassen et al, Nanocrystalline Mg-based Hydrides: Hydrogen Storage for the Zero-Emission Vehicle.
H. Tamura et al, Thickness Dependence of Coloration of Anodic Tungsten Oxide Films for Hydrogen Detection, Solid State Phenomena, vols. 51-52 (1996), pp. 429-434.
http://www.ndt.net/article/v07n07/smith/smith.htm, Sep. 14, 2003, Diffusible Weld Hydrogen—Measurement by Fiber Optic Sensors, NDT.net—Jul. 2002, vol. 7, No. 7,R.D. Smith II et al, "Diffusible Web Hydrogen—Measurement by Fiber Optic Sensors", pp. 1-7.
http://www.micropat.com/cgi-bin/pslist, Aug. 18, 2003, Japanese Patent Abstract JP2000239768, "Hydrogen Storage Alloy Enabling High Rate Discharge of Battery", Mitsubishi Materials Corp., Kita Koichi et al, published Sep. 5, 2000.
https://www.delphion.com/cgi-bin/viewpat.cmd/JP21093519A2, Apr. 7, 2004, Patent Abstracts of Japan, "Hydrogen Storage Alloy Paste Electrode For Sealed Alkaline Battery", Sanyo Electric Co. Ltd., Higashiyama et al, published Apr. 6, 2001.
https://www.delphion.com/cgi-bin/viewpat.cmd/JP21015107A2, Apr. 7, 2004, Patent Abstracts of Japan, " Hydrogen Storage Alloy Electrode for Alkaline Storage Battery", Sanyo Electric Co. Ltd., Higashiyama et al, published Jul. 2, 1999.
European Search Report dated Jun. 8, 2005.

\* cited by examiner

FIG. 1

| H | | | | | | | | | | | | | | | | | He |
|---|---|---|---|---|---|---|---|---|---|---|---|---|---|---|---|---|---|
| Li | Be | | | | | | | | | | | B | C | N | O | F | Ne |
| Na | Mg - | | | | | | | | | | | Al - | Si (+) | P | S | Cl | Ar |
| K - | Ca + | Sc + | Ti + | V + | Cr + | Mn + | Fe + | Co + | Ni + | Cu (+) | Zn - | Ga | Ge (+) | As | Se | Br | Kr |
| Rb | Sr + | Y + | Zr + | Nb + | Mo + | Tc + | Ru + | Rh + | Pd + | Ag - | Cd - | In - | Sn | Sb | Te | J | Xe |
| Cs | Ba + | La + | Hf + | Ta + | W + | Re + | Os + | Ir + | Pt + | Au - | Hg - | Tl | Pb - | Bi | Po | At | Rn |
| Fr | Ra | Ac | | | | | | | | | | | | | | | |

IONIC (SALT-LIKE) HYDRIDES | TRANSITION METAL HYDRIDES ('METALLIC' HYDRIDES) | BORDER LINE CASES | COVALENT HYDRIDES

COMPOSITIONS AND METHODS FOR HYDROGEN STORAGE AND RECOVERY

BACKGROUND

This disclosure relates to devices and methods for hydrogen storage and recovery.

Hydrogen is a "clean fuel" because it can be reacted with oxygen in hydrogen-consuming devices, such as a fuel cell or a combustion engine, to produce energy and water. Virtually no other reaction byproducts are produced in the exhaust. As a result, the use of hydrogen as a fuel effectively solves many environmental problems associated with the use of fossil-fuels. Safe and efficient storage of hydrogen gas is, therefore, an important feature for many applications that can use hydrogen. In particular, minimizing volume and weight of the hydrogen storage systems are important factors in mobile applications.

Several methods of storing hydrogen are currently used but these are either inadequate or impractical for widespread consumer applications. For example, hydrogen can be stored in liquid form at very low temperatures. Cryogenic storage, however, provides a low volume density of hydrogen storage per liter, and is insufficient for consumer applications. In addition, the energy consumed in liquefying hydrogen gas is about 30% of the energy available from the resulting hydrogen. Finally, liquid hydrogen is neither safe nor practical for most consumer applications.

An alternative is to store hydrogen under high pressure in cylinders. However, a 45 kilogram steel cylinder can only store about one pound of hydrogen at about 154 kilogram/square centimeter ($kg/cm^2$), which translates into 1% by weight of hydrogen storage. More expensive composite cylinders with special compressors can store hydrogen at higher pressures of about 316 $kg/cm^2$ to achieve a more favorable storage ratio of about 4% by weight. Although even higher pressures are possible, safety factors and the high amount of energy consumed in achieving such high pressures have compelled a search for alternative hydrogen storage technologies that are both safe and efficient.

Hydrogen can also be stored in several types of solid-state materials. The reversible storage of hydrogen in solid-state materials depends on the thermodynamic and kinetic properties of the storage material to absorb, dissociate, and react reversibly with hydrogen to form the hydrogen storage material. There are several modes and mechanisms in which hydrogen storage can occur if the chemical potentials and kinetics are favorable toward hydriding, complexation or hydrogen sorption. In some cases alloying or forming composite materials can favorably alter the thermodynamics of potential hydrogen storage materials. Also the "doping" of catalyst into hydrogen storage materials has been shown to improve reaction rate and decrease activation energy for the reversible hydrogen storage reaction. Although these materials strategies can improve the overall performance of several types of storage materials, there has not been an effort to generally exploit these chemical and thermodynamic properties across a wide range of storage materials.

In view of the above, there is a need for safer, more effective and efficient methods of storing and recovering hydrogen. In the case of solid-state hydrogen storage materials there is a need to improve the thermodynamic and kinetic properties of storage materials to decrease sorption and desorption energy requirements, while maintaining a sufficient hydrogen charge and discharge rate. In addition, there is a desire to minimize the overall system volume and weight.

BRIEF DESCRIPTION OF THE INVENTION

Disclosed herein is a hydrogen storage composition comprising a catalyst composition disposed upon a storage composition; wherein the catalyst composition consists essentially of calcium, barium, titanium, chromium, manganese, iron, cobalt, copper, silicon, germanium, rhodium, rhodium, ruthenium, molybdenum, niobium, zirconium, yttrium, barium, lanthanum, hafnium, tungsten, rhenium, osmium, or iridium.

Disclosed herein too is a hydrogen storage composition comprising a catalyst composition disposed upon a storage composition; wherein the catalyst composition comprises an alloy of calcium, barium, platinum, palladium, nickel, titanium, chromium, manganese, iron, cobalt, copper, silicon, germanium, rhodium, rhodium, ruthenium, molybdenum, niobium, zirconium, yttrium, barium, lanthanum, hafnium, tungsten, rhenium, osmium, iridium, or a combination comprising at least one of the foregoing metals.

Disclosed herein too is a method for storing hydrogen comprising immersing in a gaseous mixture comprising hydrogen, a hydrogen storage composition comprising a catalyst composition disposed upon a storage composition, wherein the catalyst composition consists essentially of calcium, barium, titanium, chromium, manganese, iron, cobalt, copper, silicon, germanium, rhodium, rhodium, ruthenium, molybdenum, niobium, zirconium, yttrium, barium, lanthanum, hafnium, tungsten, rhenium, osmium, or iridium; dissociating the hydrogen into atomic hydrogen; and storing the atomic hydrogen in the storage composition.

Disclosed herein too is a method for storing hydrogen comprising immersing in a gaseous mixture comprising hydrogen, a hydrogen storage composition comprising a catalyst composition disposed upon a storage composition, wherein the catalyst composition comprises an alloy of calcium, platinum, palladium, nickel, barium, titanium, chromium, manganese, iron, cobalt, copper, silicon, germanium, rhodium, rhodium, ruthenium, molybdenum, niobium, zirconium, yttrium, barium, lanthanum, hafnium, tungsten, rhenium, osmium, or iridium; and dissociating the hydrogen into atomic hydrogen; and storing the atomic hydrogen in the storage composition.

Disclosed herein too is a method for generating hydrogen comprising heating a hydrogen storage composition comprising a catalyst composition disposed upon a storage composition, wherein the catalyst composition catalyst composition consists essentially of calcium, barium, titanium, chromium, manganese, iron, cobalt, copper, silicon, germanium, rhodium, rhodium, ruthenium, molybdenum, niobium, zirconium, yttrium, barium, lanthanum, hafnium, tungsten, rhenium, osmium, or iridium; or wherein the catalyst composition comprises an alloy of calcium, platinum, palladium, nickel, barium, titanium, chromium, manganese, iron, cobalt, copper, silicon, germanium, rhodium, rhodium, ruthenium, molybdenum, niobium, zirconium, yttrium, barium, lanthanum, hafnium, tungsten, rhenium, osmium, or iridium.

Disclosed herein too is method for the storage and recovery of hydrogen comprising contacting a hydrogen storage composition with a first gaseous mixture comprising a first concentration of hydrogen; dissociating the hydrogen into atomic hydrogen; storing the atomic hydrogen in the storage composition; contacting the hydrogen storage composition with a second gaseous mixture comprising a second concentration of hydrogen; and heating the hydrogen storage to a temperature effective to facilitate the desorption of hydrogen from the hydrogen storage composition.

Disclosed herein too is an energy generation device utilizing the aforementioned composition and method.

DETAILED DESCRIPTION OF THE FIGURES

FIG. 1 is a periodic table of elements indicating those metals which chemisorb hydrogen with a high sticking probability (+) and those which do not (−); and FIG. 2 is a schematic showing a system for the absorption and desorption (recovery) of hydrogen from a hydrogen storage composition.

DETAILED DESCRIPTION OF PREFERRED EMBODIMENTS

Disclosed herein are hydrogen storage compositions that comprise a catalyst composition disposed upon a storage composition, wherein the catalyst is capable of dissociating molecular hydrogen into atomic or ionic hydrogen and wherein the storage composition can store the atomic hydrogen. Disclosed herein too is a method for storing hydrogen that comprises immersing the hydrogen storage composition into hydrogen gas, dissociating the hydrogen gas into atomic hydrogen which is then stored in the storage composition. The stored hydrogen may then be utilized for the recovery of hydrogen in energy generating devices such as fuel cells, gas turbines, or the like. This method of hydrogen storage and recovery may also be advantageously used in a land mobile such as an automobile, a train, and the like; a water craft such as a barge, ship, submarine, and the like; or an airborne carrier or a space ship such as an airplane, rocket, space station, and the like.

The catalyst composition generally comprises metals that can chemisorb hydrogen with a higher sticking probability. FIG. 1 shows a periodic table reflecting elements that display an appreciable sticking probability for hydrogen. In the table all materials that have a high sticking probability are shown with plus (+) signs. Suitable examples of these metals are calcium, barium, titanium, chromium, manganese, iron, cobalt, nickel, copper, silicon, germanium, rhodium, palladium, rhodium, ruthenium, molybdenum, niobium, zirconium, yttrium, barium, lanthanum, hafnium, tungsten, rhenium, osmium, iridium, platinum, or a combination comprising at least one of the foregoing metals. In one embodiment the catalyst composition comprises essentially of calcium, barium, titanium, chromium, manganese, iron, cobalt, copper, silicon, germanium, rhodium, rhodium, ruthenium, molybdenum, niobium, zirconium, yttrium, barium, lanthanum, hafnium, tungsten, rhenium, osmium, or iridium; or wherein the catalyst composition comprises an alloy of calcium, platinum, palladium, nickel, barium, titanium, chromium, manganese, iron, cobalt, copper, silicon, germanium, rhodium, rhodium, ruthenium, molybdenum, niobium, zirconium, yttrium, barium, lanthanum, hafnium, tungsten, rhenium, osmium, or iridium.

Alloys of these metals may also be used. In one embodiment the alloys may contain platinum. In another embodiment, the alloys may contain palladium. In yet another embodiment, the alloys may contain nickel. Suitable examples of metals that may be alloyed with either platinum and/or palladium and/or nickel for the dissociation of molecular hydrogen into atomic hydrogen are calcium, barium, titanium, chromium, manganese, iron, cobalt, copper, silicon, germanium, rhodium, rhodium, ruthenium, molybdenum, niobium, zirconium, yttrium, barium, lanthanum, hafnium, tungsten, rhenium, osmium, iridium, or a combination comprising at least one of the foregoing metals.

The platinum and/or palladium and/or nickel may generally be present in an amount of about 0.1 to about 75 weight percent based on the total weight of the catalyst composition. Within this range, it is generally desirable for the platinum and/or palladium and/or nickel to be present in an amount of greater than or equal to about 0.5, preferably greater than or equal to about 3, and more preferably greater than or equal to about 5 wt %, of the total weight of the composition. Also desirable is an amount of less than or equal to about 70, preferably less than or equal to about 65, and more preferably less than or equal to about 50 wt %, of the total weight of the composition.

The catalyst composition is disposed upon a storage composition. The storage composition advantageously facilitates the storage of atomic hydrogen. Suitable examples of materials that may be utilized in the storage compositions are carbon, oxides, aluminides, carbides, silicides, sulfides, nitrides, borides, oxides, oxynitrides, hydroxides, silicates, alanates, aluminosilicates, or the like, or a combination comprising at least one of the foregoing.

Preferred forms of carbon that may be used in the storage composition are those having high surface areas such as carbon black and/or carbon nanotubes. Suitable carbon nanotubes are either vapor grown carbon fibers, single wall carbon nanotubes and/or multiwall carbon nanotubes.

Suitable oxides that may be used in the storage composition are silicon dioxide (e.g., fumed silica), alumina, ceria, titanium dioxide, zirconium oxide, tungsten oxide, vanadium pentoxide, or the like, or a combination comprising at least one of the foregoing oxides. The oxides may be prepared using aerogel technology. Metal oxides are generally preferred. The metal oxides generally comprise tungsten oxide ($WO_3$), nickel oxide ($NiO_2$), cobalt oxides ($CoO_2$), manganese oxides ($Mn_2O_4$ and $MnO_2$), vanadium oxides ($VO_2$ and $V_2O_5$), molybdenum oxide ($MoO_2$), or the like, of combinations comprising at least one of the foregoing oxides.

It is generally desirable for the storage composition to have a surface area of greater than or equal to about 10 $m^2/gm$. In one embodiment, it is desirable for the storage composition to have a surface area of greater than or equal to about 50 $m^2/gm$. In another embodiment, it is desirable for the storage composition to have a surface area of greater than or equal to about 100 $m^2/gm$.

In one embodiment, the storage composition may comprise nanoparticles. The nanoparticles may have sizes of about 1 to about 200 nanometers upon which the catalyst composition may be disposed. Within this range, a particle size of greater than or equal to about 3, preferably greater than or equal to about 5, and more preferably greater than or equal to about 10 nanometers may be used. Within this range, particle sizes of less than or equal to about 150, preferably less than or equal to about 100, and more preferably less than or equal to about 80 nm may be used.

The catalyst composition is generally deposited onto the storage composition via sputtering, chemical vapor deposition, from solution, or the like. In one embodiment, the catalyst composition may completely cover a surface area of about 1 to about 100% of the total surface area of the storage composition. Within this range, a surface area coverage of greater than or equal to about 5, preferably greater than or equal to about 10, and more preferably greater than or equal to about 15% of the total surface area of the storage composition is desirable. Also desirable within this range, is a surface area coverage of less than or equal to about 90, preferably less than or equal to about 75, and more preferably less than or equal to about 50% of the total surface area of the storage composition.

When the catalyst composition does not cover 100% of the surface area of the storage composition, it may be desirable for the catalyst composition to be disposed onto the surface of the storage composition as isolated particulates. There is no particular limitation to the shape of the particles, which may be for example, spherical, irregular, plate-like or whisker like. Bimodal or higher particle size distributions may also be used. The particulates of the catalyst composition may have radii of gyration of about 1 to about 200 nanometers (nm). Within this range, particulate radii of gyration of greater than or equal to about 3, preferably greater than or equal to about 5, and more preferably greater than or equal to about 10 nm may be used. Also usable are particulate radii of gyration of less than or equal to about 150, preferably less than or equal to about 100 and more preferably less than or equal to about 75 nm.

In another embodiment, the nanoparticles and microparticles of the storage composition with the catalyst composition disposed upon them may be fused together under pressure to form the hydrogen storage composition. It is generally desirable for the storage composition to be present in an amount of about 30 to about 99 wt %, based on the total weight of the hydrogen storage composition. Within this range, it is desirable for the storage composition to be present in an amount of greater than or equal to about 35, preferably greater than or equal to about 40, and more preferably greater than or equal to about 45 wt % of the total weight of the hydrogen storage composition. Within this range, it is desirable for the storage composition to be present in an amount of less than or equal to about 95, preferably greater than or equal to about 90, and more preferably greater than or equal to about 85 wt % of the total weight of the hydrogen storage composition.

In one embodiment related to the storage of hydrogen the hydrogen storage composition is immersed in an environment containing hydrogen. The hydrogen, which is molecular in structure is dissociated into atomic hydrogen by the catalyst composition and stored in the storage composition. The hydrogen is then desorbed from the hydrogen storage composition by the application of heat.

The storage of hydrogen may be undertaken in a device termed an applicator. The applicator is the container that holds the hydrogen storage composition. In another embodiment, during the storage of hydrogen into the hydrogen storage composition, the hydrogen may be introduced into the applicator under pressure or the applicator may be pressurized after the introduction of hydrogen. The hydrogen storage composition may also be agitated during the storage process to obtain a uniform storage of hydrogen into the hydrogen storage composition. Since the storage of hydrogen is, in general, an exothermic reaction, the applicator may be cooled with water, liquid nitrogen, liquid carbon dioxide or air if desired during the storage of hydrogen.

The hydrogen may be introduced into the applicator with other non-reactive gases in order to facilitate the storage process. Such a combination of hydrogen with other gases is referred to as a gaseous mixture. Preferred non-reactive gases are the inert gases. When other gases are introduced along with the hydrogen, the hydrogen content is generally about 50 to about 99 weight percent (wt %) based on the total weight of the gaseous mixture.

During the recovery of hydrogen, heat may be supplied to the storage composition to generate hydrogen. In order to generate hydrogen from the storage composition, heat may be supplied to the storage composition in a number of different ways.

In yet another embodiment, hydrogen desorption can be induced by heating the storage composition using an electrical resistor embedded in the composition. The energy of the current flowing into the resistor is converted into heat by the Joule effect. The amount of heat created locally by the current flow is particularly high in the case of a compressed powdered storage composition, with hot spots on the current paths between powder particles, where the resistivity is very high. In extreme cases, powder welding may occur at the hot spots. Therefore, the current parameters should be adjusted properly to avoid sintering. Depending on the conditions of the process, the storage composition may be heated by the use of multiple resistors in the manner detailed above.

Another method of inducing hydrogen desorption consists of applying ultrasonic energy to the storage composition. The storage composition is first disposed in a liquid such as water and alcohol. By using liquids such as water or alcohol as energy carrier mediums, it is possible to generate shock waves and localized heating through acoustic cavitation, which generally occurs upon the application of ultrasonic energy. The acoustic cavitation results in the formation of hot spots that reach temperatures of as high as 5000° K. over periods of less than 1 microsecond. The formation of such hot spots having such elevated temperatures promotes the desorption of hydrogen. This method therefore provides for an easy and efficient hydrogen recovery process.

In one exemplary method of producing and storing hydrogen with the hydrogen storage compositions, a system shown in the figure comprises an optional hydrogen storage composition reactor (a first applicator at a first location) upstream of and in fluid communication with a hydrogen recovery reactor (a second applicator at a second location). As noted above, if desired, the first applicator may be different from the second applicator and the first location may be different from the second location. In another embodiment, the first applicator may be the same as the second applicator and the first location may be the same as the second location. The hydrogen storage composition may optionally be in the form of a slurry if desired.

At least a portion of the hydrogen storage composition in the hydrogen recovery reactor is utilized for the recovery of hydrogen from the hydrogen storage compositions. When a hydrogen storage composition has released its hydrogen it is termed a spent hydrogen storage composition. The hydrogen recovery reactor may use convectional heating, conductional heating, PEM fuel cell exhaust, ultrasonic energy, and the like, to heat the hydrogen storage composition for purposes of hydrogen recovery. The hydrogen recovery reactor is also upstream of and in fluid communication with an optional drying and separation reactor and the spent hydrogen storage composition may be optionally transferred to the drying and separation reactor. At least a portion of spent hydrogen storage composition generated in the hydrogen recovery reactor is optionally recycled to the drying and separation reactor. The hydrogen recovery reactor is optionally supplied with water. The optional drying and separation reactor separates any reusable fluids such as water from the spent hydrogen storage composition and recycles the fluid to the optional hydrogen storage composition reactor. The hydrogen storage composition is then recycled to the hydrogen storage composition reactor for mixing with the recycled carrier liquids and for regeneration.

This method of hydrogen storage and recovery may be advantageously be used for on board recovery of hydrogen in fuel cells placed on small vehicles such as automobiles having a weight of up to about 2,500 kilograms. This method of hydrogen storage and recovery may also be advantageously used in a land mobile such as an automobile, a train, and the like; a water craft such as a barge, ship, submarine, and the like; or an airborne carrier or a space ship such as an airplane, rocket, space station, and the like. It may also be used for the recovery of hydrogen in fuel cells used for power generation used for residential applications, factories, office buildings, and the like.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A hydrogen storage composition consisting essentially of a catalyst composition disposed upon a storage composition;
    wherein the catalyst composition consists essentially of barium;
    wherein the storage composition consists essentially of alanates.

2. The composition of claim 1, wherein the catalyst composition covers a surface area in a range of from about 1 percent to about 100 percent of the total surface area of the storage composition.

3. The composition of claim 1, wherein the catalyst composition is disposed onto the surface of the storage composition as isolated particulates.

4. The composition of claim 1, wherein the isolated particulates have a radius of gyration in a range of from about 1 nanometer to about 200 nanometers.

* * * * *